United States Patent [19]

Chen

[11] Patent Number: 4,699,539
[45] Date of Patent: Oct. 13, 1987

[54] CHAIN LID FASTENER

[76] Inventor: Chien K. Chen, 306, Chang Nan Rd. Sec. 4, Fen Yuan Hsiang, Changhua Hsien, Taiwan

[21] Appl. No.: 913,571

[22] Filed: Sep. 29, 1986

Related U.S. Application Data

[63] Continuation of Ser. No. 743,625, Jun. 11, 1985, abandoned.

[51] Int. Cl.$^4$ .............................................. B62J 13/00
[52] U.S. Cl. ...................................... 403/24; 403/192; 403/234; 474/144; 411/549; 411/550
[58] Field of Search ................ 403/392, 24, 195, 192, 403/234, 386; 269/229, 232, 287; 24/593, 594, 19; 411/349, 550, 553, 549; 248/230; 474/144

[56] References Cited

U.S. PATENT DOCUMENTS

| 439,771 | 11/1890 | Brown | 411/549 X |
|---|---|---|---|
| 2,529,582 | 11/1950 | Zahodiakin | 411/550 |
| 2,584,788 | 2/1952 | Cich | 474/144 |
| 2,827,254 | 3/1958 | Faber | 403/353 X |
| 4,507,105 | 3/1985 | Stottmann et al. | 403/344 X |
| 4,639,240 | 1/1987 | Liu | 403/344 X |

FOREIGN PATENT DOCUMENTS

| 473002 | 3/1929 | Fed. Rep. of Germany | 474/144 |
|---|---|---|---|
| 493838 | 3/1930 | Fed. Rep. of Germany | 474/144 |
| 2325233 | 12/1963 | Fed. Rep. of Germany | 403/353 |

Primary Examiner—Andrew V. Kundrat
Assistant Examiner—Joseph A. Fischetti
Attorney, Agent, or Firm—Browdy and Neimark

[57] ABSTRACT

A chain guard fastener for secure fitting of the down tube and the seat tube of a bicycle comprises a fastening means and bolt having a key projecting in front thereof to permit engagement with a counterpart keyway provided on the chain guard. The fastening means is made of molded plastic, and includes a median split and a cylindrical form projecting out of a pair of symmetrically disposed faces, two suitably formed bolting ports traversing the pair of faces on either side thereof so as to permit passage of a bolt therethrough. One end of the bolt is stopped, while the other end of the bolt goes to a continuously toothed groove, in close proximity of the teeth.

3 Claims, 9 Drawing Figures

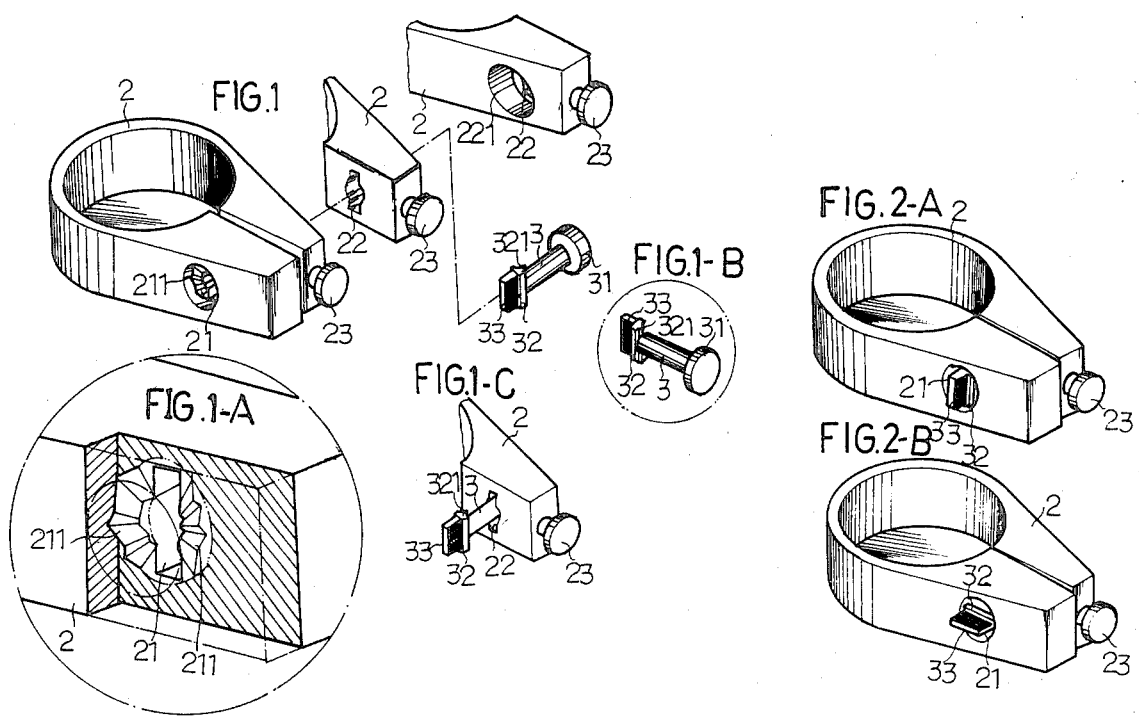
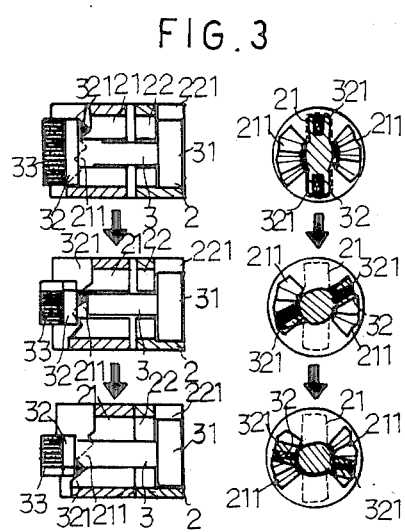
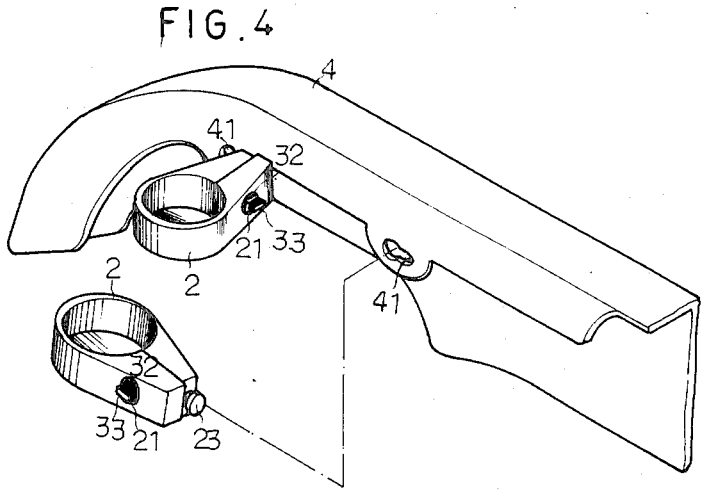
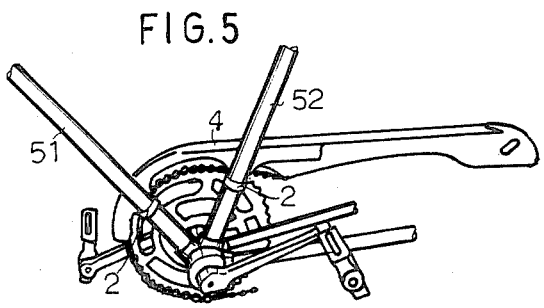

CHAIN LID FASTENER

This application is a continuation of application Ser. No. 743,625, filed 6-11-85.

FIELD OF THE INVENTION

The present invention relates to a chain guard fastener, more specifically to a fastener which provides secure fitting of the down tube and the seat tube of a bicycle.

BACKGROUND OF THE INVENTION

Traditionally, the chain guard of a bicycle has been fitted by bending a thin metal sheet under pressure and locking the sheet at the ends thereof in front and in back by means of locking bolts concurrent with the locking of the chain guard. The disadvantages of such fitting include the need for repeated fastening of the guard with a screwdriver; much manual labor; much manipulation in the placing, aligning, and pressing; the need for additional bolt lockings, holding of the chain guard, etc. All of this is troublesome, and the metal tools and fittings used in the working thereof will easily scratch the bicycle tube, removing the paint therefrom. Additionally, because the thin metal items have a high plasticity but lack elasticity, the metal items, upon being subjected to repeated mounting and dismounting, will fail to match as they should, and will come out of alignment. Still worse is that, in cases in which the fasteners are deformed in some way when they are meant to serve a locking purpose, they will defeat attempts to accomplish the work involved. These disadvantages result from the inferiority of the traditional fasteners for repeated use and their incompatibility for operation with associated parts and components.

SUMMARY OF THE INVENTION

It is an object of the present invention to provide a molded, plastic chain guard fastener to replace the traditional metal fasteners, which typically lack flexibility. The chain guard of the present invention has sufficient flexibility to accommodate easy bending and restoration, and will permit close, precision fitting to the elongate members of a bicycle while exhibiting low production costs, light weight, and simple construction.

Another object of the present invention is to provide a chain guard fastener which achieves the fastening effects of a chain guard by manual manipulation of the central bolt thereof to force the anteriorly projected tooth of the bolt to be fed into a high position tooth dent by rotation. This is accomplished by diminishing the clearance to the split for the fastener, and this can be done without use of a tool.

Another object of the present invention is to provide a chain guard fastener which incorporates a projected key in front thereof, which key matches a keyway provided on the chain guard, which simplifies the structure of the chain guard by obviating the use of additional bolting elements, and permits prompt assembly.

The chain guard fastener of the present invention consists of a fastening means and a bolt having a key projected in front thereof to permit engagement with a counterpart keyway provided on the chain guard. The fastening means is made of molded plastic, including a median split and a cylindrical form projecting from a pair of symmetrically disposed faces. Two suitably formed bolting ports each traverse said pair of faces on either side so as to permit passage of a bolt, thereby causing one end of the bolt to be stopped at a deadpoint, while the other end thereof is carried to a specially prepared continuous toothed groove gradually in the upward direction, in close proximity to the teeth provided on the projecting end, through a rotative adjustment so as to achieve a one-way withdrawal of the bolt. The median split on the contact surface of the fastening means is brought fixed to the tube an in a position as such ready for manual, secure locking.

Other features and advantages of the present invention will be made evident from the following description of specific embodiments of the invention which are provided by way of illustration but are not in any way limiting.

DESCRIPTION OF THE DRAWINGS

FIGS. 1A-C shows a chain guard fastener according to the present invention.

FIGS. 2A and B shows the chain guard fastener of the present invention in the closed position.

FIG. 3 shows the cotter hole of the chain guard fastener of the present invention.

FIG. 4 shows the fitting of the chain guard fastener on a bicycle frame.

FIG. 5 shows the chain guard fastener of the present invention fitted onto the tubing of a bicycle frame.

Referring to FIG. 1, it can be seen that the chain guard fastener of the present invention comprises a fastening element 2 and a compression bolt 3. The fastening element is formed by molding and is annular in shape, having one median split for attachment to the chain guard. The contact area is symmetrically structured and provides a pair of longitudinal cotter holes 21, 22. The center of each hole bulges out slightly. Both holes 21, 22 diverge laterally to form a detent cavity 221 on one end of the guard. The orifice of hole 21 has an annular surface so that an arcuated continuous denticulation 211 is formed around the periphery of this hole, pointing in the upward direction.

The structure disclosed thus far permits the penetration of a compression bolt 3 into said cotter holes 21, 22, for twisting to a dead-lock position. The compression bolt 3 is provided with an enlarged guard plate 31 on one side, and with a compression member 32 on the other side. The compression member 32 is of a breadth slightly less than the outer diameter of the bolt. The interior of the compression bolt is furnished with a pair of projecting teeth 321 which are vertically aligned, as can be better seen by reference to FIG. 1-B. Also, the backside of the compression member 32 is provided with an outstanding knob 23 to facilitate fingertip adjustment in a rotating manner.

The compression bolt 3 has free access to the cotter holes 21, 22, being inserted into cotter hole 21. FIG. 1-C shows in greater detail the arrangement whereby the rear bumper 31 checks against the detent cavity 221, so that when the spanner board is in place the interior denticulation 321 of compression member 32 will provide reliable catching effects when the compression bolt is in place.

On either side of the frontal end of the contact face of the fastening means 2 optionally may be provided a projecting key 23 tapering rearwards to permit catchup engagement with a suitably configured keyway provided on corresponding positions on the chain guard.

The configuration for the structure disclosed thus far secures a compression-bound adjustment by the action of the teeth 321 provided on the compression member 32 of the compression bolt 3 in conjunction with the specially processed denticulated front 211 on the forward section of cotter hole 21, which action will be described in further details hereinafter.

Referring once again to FIG. 1, it is seen that after the compression bolt 3 provides a complete coupling with compression member 32 via cotter holes 21, 22, a slight twisting adjustment of the compression member 32 will result in misalignment with cotter hole 21 so that the compression bolt 3 is forced to hang onto two rows of cross bars lying in front of the fastener 2, so that the surface in contact therewith is thereby restricted from further expansion, and arrives at initial closure status as shown in FIG. 2-A.

The force exerted by the compression member 32 reaches only to the outer limits of the closure formed on both sides of the bumper 31, this being sufficient to restrict the fastener 2 from stretching out. When it is desired to adjust the fastening, torsion momentum should be applied to the twisting board 33 outside the compression bolt 3, so that the projecting tooth 321 inside the compression member 32 is brought upwards bit by bit from the initial location short of engagement with the toothed front 211, along the toothed front 211, and over the continuous groove thereof. This eventually provides a situation such as shown in FIG. 3, i.e., whenever the tooth 321 is further engaged into the higher grooves in the toothed front 211, that portion of the compression bolt 3 that is brought into the mounting surrounding the cotter hole 21 sill be withdrawn in like measure by force, thereby gradually diminishing the gap for contact. Once such a gap wanes out completely, a firm checking restriction will be established as shown in FIG. 2-B.

The size of the gap is representative of the diameter of the ring inside the fastener. The smallest possible size means the provision of a reliable fastening effect around the tube of a bicycle. The tube may be the down tube or the seat tube. The chain guard may be adjusted by twisting manually in stages.

Referring to FIG. 4, it is seen that an outstanding knob 23 on the front of fastener 2, for which a guitar-like keyway is provided by symmetry on the chain guard 4, is designed for insertion through the larger cavity of the keyway and shifted thereafter to the smaller cavity of the keyway so that the smaller bolting stem inside the knob 23 may lie secure therein. This applies equally effectively to the down tube 51 and to the seat tube 52, respectively, by manually twisting the chain guard without the need for additional bolting parts.

I claim:

1. A chain guard fastener for fastening a bicycle chain guard to a tubular element of a bicycle, said chain guard fastener comprising:

a fastening means and a bolt, said bolt having a first end and a second end;

said fastening means including a key projected in front thereof; said key matching a keyway on a bicycle chain guard;

said fastening means being made of molded plastic, having two symmetrically disposed faces and a contact area including a median split for attachment to a chain guard;

the contact area being symmetrically structured and including a first hole and a second hole formed longitudinally therethrough;

said holes each diverging laterally to form a detent cavity on each outer end of said fastening means;

the first one of said cavities having an annular surface forming an arcuated inclined continuous denticulation around the periphery of said first hole;

said compression bolt having an enlarged guard plate on the first end thereof;

said compression bolt having a compression member on the second end thereof;

said compression member having on the interior thereof a pair of projecting teeth which are vertically aligned;

said compression member having on the backside thereof an outstanding knob;

a cylindrical form projecting from said symmetrically disposed faces;

said two holes traversing said fastening means so as to permit passage of said bolt so as to cause the first end of said bolt to be stopped at a dead-point by the other of said cavities;

the projecting teeth on the second end of said bolt being carried to the continuous denticulated first cavity on said first hole for rotatable, lacking engagement therewith.

2. The chain guard fastener of claim 1 wherein the projecting key fits into a keyway on the chain guard which is configured so as to be larger in the front than in the rear thereof.

3. The chain guard fastener of claim 2 wherein said projecting key tapers towards the rear of said fastening means.

* * * * *